UNITED STATES PATENT OFFICE.

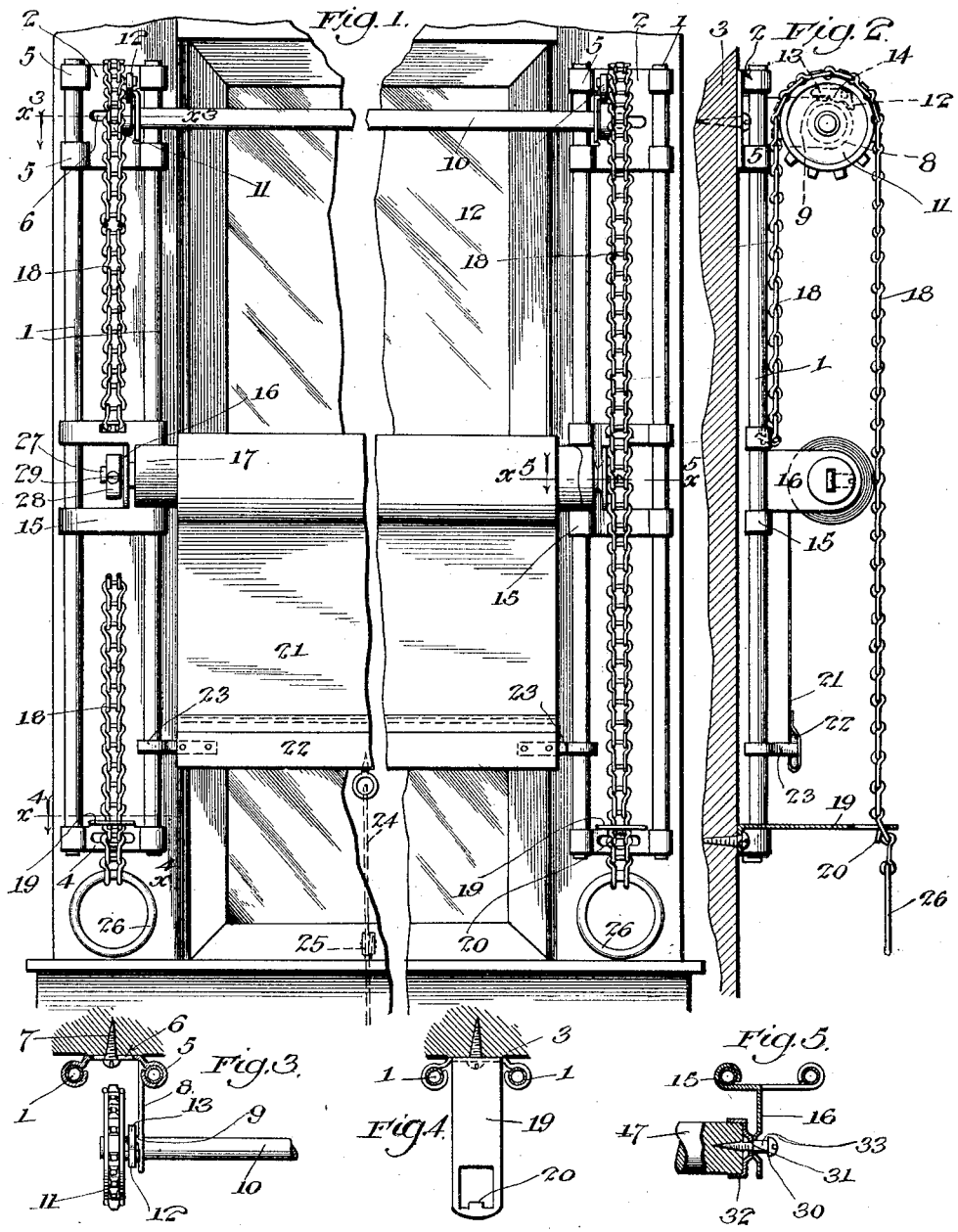

LOUIS B. GIRARD AND JOHN P. WHITMORE, OF LOS ANGELES, CALIFORNIA, ASSIGNORS TO GIRARD MANUFACTURING COMPANY, OF LOS ANGELES, CALIFORNIA, A CORPORATION OF CALIFORNIA.

SHADE-ADJUSTER.

1,112,000.      Specification of Letters Patent.      Patented Sept. 29, 1914.

Application filed May 24, 1913. Serial No. 769,697.

*To all whom it may concern:*

Be it known that we, LOUIS B. GIRARD and JOHN P. WHITMORE, both citizens of the United States, residing at Los Angeles, in the county of Los Angeles and State of California, have invented a new and useful Shade-Adjuster, of which the following is a specification.

This invention relates to shade adjusters, and has for its object to provide a device for enabling the shade roller with its shade to be adjusted vertically to any desired point.

Another object is to provide for holding the lower end of the shade stationary and adjusting the roller vertically, thereby shading the lower part of the window to allow the light to come in at the upper part in the desired amount, thus attaining the same result as though the roller were located at the bottom, with the added advantage that by reason of the roller being at the top there is no chance for falling dirt to accumulate on the roller in the crevice where the unrolled portion of the shade leaves the roller.

Another object is to enable the adjustment to be performed from either side of the window, and to cause both sides of the roller to be positively adjusted simultaneously and equally irrespective of from which side the adjustment is performed.

Other advantages will be brought out in the following description.

Referring to the drawings: Figure 1 is a front elevation of a window and shade equipped with the invention. Fig. 2 is a side elevation of the invention, part of the wall being in section. Fig. 3 is a section on line $x^3$—$x^3$, Fig. 1. Fig. 4 is a section on line $x^4$—$x^4$, Fig. 1. Fig. 5 is a section on line $x^5$—$x^5$, Fig. 1.

On each side of the window is a pair of vertical bars 1 which are supported at their upper ends by a bracket 2 which is secured to the wall 3, and at their lower ends are secured by a bracket 4, which is screwed to the wall. Each upper bracket 2 is preferably formed of sheet metal as shown. Four wing portions 5 are curled around the rods 1, and is slotted at 6 to receive the screw 7, the slot 6 permitting lateral adjustment of the fixture. Projecting forward from each upper bracket 2 is an arm 8 which has an offset lug 9 shown clearly in dotted lines in Fig. 2. Journaled in each arm 8 is a shaft 10 carrying a sprocket 11 at each end, and each sprocket 11 has pivoted to it a dog 12, see Figs. 2 and 3, the dog 12 having an extension 13 acting as a weight, and having a shoulder 14 which is adapted to engage the lug 9 when the sprocket moves slowly enough to permit the weighted end 13 to fall and rest upon the lug 9 as indicated in Fig. 2. When the sprocket revolves at a faster speed the resulting centrifugal force causes the weighted end 13 to swing outward and thus prevents the shoulder 14 of the dog from striking the lug 9 and arresting the movement of the sprocket.

A traveling bracket 15 is slidable on each pair of rods 1 and each bracket 15 has a projecting arm 16, and the arms 16 support a shade roller 17. Attached to each bracket 15 is a chain 18, each chain 18 running over its associated sprocket 11 and extending down and through a projecting arm 19 on the lower bracket 4, the arm 19 having a downturned finger 20 with which any one of the links of chain 18 may be engaged to hold the chain and thus secure the brackets 15 and shade roller 17 and shade 21 in the desired position.

The lower bar 22 of the shade has guide members 23 which slide over the inner rods 1 and thus positively cause the shade to travel in a vertical line under all conditions. A cord indicated at 24 may be attached to the lower end of the shade, and this cord may be adjustably secured to a fixture 25 to hold the lower end of the shade stationary if desired, and then by manipulating either of the chains 18 the shade roller 17 may be raised or lowered to shade a greater or less portion of the lower part of the window.

To adjust the shade to a higher position than shown in Fig. 1 either of the chains 18 may be pulled down by means of its ring 26 and this action will release it from the finger 20. Continued downward movement of the chain will draw upwardly on the associated bracket 15 and raise that end of the shade roller and shade. At the same time this movement of the chain rotates this sprocket 11 and thus turns shaft 12, thereby rotating the opposite sprocket 11 a corresponding amount and thereby through the chain connected with the latter sprocket will raise the corresponding end of the shade roller. From this it will be seen that it is not necessary to exert a pull upon both chains in order to adjust the shade roller as either chain may be actuated, or will be automatically operated as described. Furthermore, it is not even necessary to disengage the chain which is not being directly pulled upon from its finger 20, because as the other chain is pulled down it causes the chain which is not directly pulled to move down and this automatically relaxes its link from engagement with associated finger 20 and automatically accomplishes the releasing therefrom. When the shade is to be lowered one or the other of the chains is also pulled down sufficiently to disengage the finger 20, which movement obviously causes automatic disengagement of the other chain from its finger 20, and then the chain is allowed to move upwardly and permit the weight of the shade roller and shade with attached brackets 15 to lower to the desired point when the chain 18 is again engaged with finger 20 and from further security. Both chains may be thus engaged with fingers 20. While the shade roller and shade may thus be adjusted bodily the shade 21 may be operated in the usual manner to shade more or less of the window by manipulating the lower bar of the shade, this action being guided by the plates 23 which insure a perfect vertical movement of the shade in such operation and prevent the shade from becoming unevenly rolled upon the shade roller. As heretofore indicated, the lower end of the shade may also be secured by cord 24, and then either of the chains 18 may be operated to move the roller 17 vertically, thereby causing the shade to shut off the lower portion of the window and allow the desired amount of light to come through the upper part of the window only or through a small part at the lower end of the window, as may be desired, thereby securing the small shading effect as in that style of shades which are arranged with their rollers at the bottom of the window, but which are objectionable on account of catching dirt in the crevices between the shade and the roller portion of the shade on the roller. The dogs 14 are capable of holding the sprockets in any desired position, but further security is afforded by connecting the chains to the fingers 20.

The shade roller is preferably secured to the arms 16 by means of the usual squared spear end 27 which engages in the arm 16, and is prevented from turning, and a collar 28 is secured on the spear end 27 by a set screw 29, the collar 28 being adjusted so that a certain endwise movement of the shade roller is possible with respect to the arm 16. At the pin end instead of the usual pin, I employ a pin or screw 30 having a shoulder 31 which takes against a cap 32 on the end of the roller 17 and has a smooth shank 33 which can slide in the arm 16 a limited distance. This construction which permits a longitudinal movement of the shade roller with respect to the arms 16 prevents the shade from falling out of the brackets in case of emergency, and also compensates for any disarrangement of the sliding brackets 15 in which one stands higher than the other, although obviously in the regular and normal operation of the device the brackets 15 are maintained at the same height by the engagement of their chains with the sprockets.

What we claim is:

1. In a shade adjuster, a vertical guide on each side of the window, a bracket on each vertical guide, a shade roller mounted in said brackets, a shaft at the upper end of said guides, a sprocket on each end of said shaft, and chains extending from the respective sliding brackets and over said sprockets for adjusting the elevation of the shade roller when either of said chains is moved, a bracket with a projecting arm at the lower end of said guides, each of said arms having an opening through which the associated chain extends, said arm having a finger adapted to be engaged by a link of the associated chain.

2. A shade adjuster comprising a pair of vertical guides on each side of the window, a vertically sliding bracket on each pair of guides, a bracket on the upper end of each pair of guides, each pair of upper brackets having a forwardly projecting arm, a shaft journaled in said arms, a sprocket on each end of said shaft, chains secured to the respective sliding brackets and extending over said sprockets, and means for detachably retaining the lower portions of said chains, each of the upper brackets having a lug, a weighted dog pivoted to each sprocket and having a shoulder adapted to engage the associated lug when the sprocket revolves slowly.

3. A shade adjuster comprising a pair of vertical guides on each side of the window, a vertically sliding bracket on each pair of guides, a bracket on the upper end of each pair of guides, each pair of upper brackets having a forwardly projecting arm, a shaft journaled in said arms, a sprocket on each end of said shaft, chains secured to the respective sliding brackets and extending over said sprockets, and means for detachably retaining the lower portions of said chains, each of said upper brackets comprising a plate with four wings, two of each of said wings being curled around a guide rod, each of said sliding brackets having four wings, two of each being curled around the guide rods and slidable thereon.

In testimony whereof, we have hereunto set our hands at Los Angeles, California, this 19 day of May, 1913.

LOUIS B. GIRARD.
JOHN P. WHITMORE.

In presence of—
MARTHA M. LANGE,
LORA M. BOWERS.